(12) United States Patent (10) Patent No.: US 8,518,600 B2
Kondo (45) Date of Patent: Aug. 27, 2013

(54) GAS CHANNEL FORMING MEMBER IN FUEL CELL

(75) Inventor: Takashi Kondo, Kariya (JP)

(73) Assignee: Toyota Shatai Kabushiki Kaisha (JP)

( * ) Notice: Subject to any disclaimer, the term of this patent is extended or adjusted under 35 U.S.C. 154(b) by 200 days.

(21) Appl. No.: 13/139,445

(22) PCT Filed: Oct. 26, 2009

(86) PCT No.: PCT/JP2009/068315
§ 371 (c)(1),
(2), (4) Date: Jun. 13, 2011

(87) PCT Pub. No.: WO2010/119584
PCT Pub. Date: Oct. 21, 2010

(65) Prior Publication Data
US 2011/0244369 A1 Oct. 6, 2011

(30) Foreign Application Priority Data
Apr. 13, 2009 (JP) ................... 2009-097291

(51) Int. Cl.
*H01M 8/04* (2006.01)
*B21D 31/04* (2006.01)
(52) U.S. Cl.
USPC ..................... 429/513; 29/2; 29/6.1
(58) Field of Classification Search
USPC ............ 428/221–223; 29/6.1, 896.6, 896.62, 29/723, 2; 52/671
See application file for complete search history.

(56) References Cited

U.S. PATENT DOCUMENTS

2009/0089989 A1* 4/2009 Hashimoto et al. ................ 29/2
2009/0155665 A1 6/2009 Hashimoto

FOREIGN PATENT DOCUMENTS

| JP | 2007-026812 A | 2/2007 |
| JP | 2007-087768 A | 4/2007 |
| JP | 2007-214020 A | 8/2007 |
| JP | 2008-021523 A | 1/2008 |
| JP | 2008-146947 A | 6/2008 |
| JP | 2008-243394 A | 10/2008 |
| JP | 2008-287945 A | 11/2008 |

OTHER PUBLICATIONS

Written Opinion of the International Searching Authority for PCT/JP2009/068315.
International Search Report for PCT/JP2009/068315.

* cited by examiner

*Primary Examiner* — Ula C Ruddock
*Assistant Examiner* — Lisa S Park Gehrke
(74) *Attorney, Agent, or Firm* — Caesar, Rivise, Bernstein, Cohen & Pokotilow, Ltd.

(57) ABSTRACT

A gas diffusion layer (19) contacts the surface of an electrode layer (17) contacting the surface of a solid electrolyte membrane (16), and a gas channel forming member (21) interposed between the gas diffusion layer (19) and a separator (23). The separator (23) and a first tilted plate portion (28a) formed on a linking plate portion (28) of a ring portion (27) of the gas channel forming member (21) form a first tilt angle ($\alpha$). The gas diffusion layer (19) and a second tilted plate portion (28b) formed on the linking plate portion (28) form a second tilt angle ($\beta$). The first tilt angle ($\alpha$) is set to be smaller than the second tilt angle ($\beta$).

5 Claims, 11 Drawing Sheets

GAS CHANNEL FORMING MEMBER IN FUEL CELL

FIELD OF THE INVENTION

The present invention relates to a gas passage forming member for a fuel cell, a method for manufacturing the gas passage forming member, and a forming device for forming the gas passage forming member.

BACKGROUND OF THE INVENTION

Typically, a fuel cell has a cell stack formed by a number of power generation cells stacked together. With reference to FIGS. 17 to 19, a prior art power generation cell will be described. As shown in FIG. 17, a power generation cell 12 includes a pair of upper and lower frames 13, 14 and an electrode structure 15 between the frames 13, 14. The electrode structure 15 is formed by a solid electrolyte membrane 16, an electrode catalyst layer 17 on the anode side, and an electrode catalyst layer 18 on the cathode side. The anode-side electrode catalyst layer 17 is laid on the upper surface of the electrolyte membrane 16, and the cathode-side electrode catalyst layer 18 is laid on the lower surface of the solid electrolyte membrane 16. A first gas diffusion layer 19 is laid on the upper surface of the electrode layer 17, and a second gas diffusion layer 20 is laid on the lower surface of the electrode layer 18. Further, a first gas passage forming member 21 is laid on the upper surface of the first gas diffusion layer 19, and a second gas passage forming member 22 is laid on the lower surface of the second gas diffusion layer 20. A flat plate-like separator 23 is joined to the upper surface of the first gas passage forming member 21, and a flat plate-like separator 24 is joined to the lower surface of the second gas passage forming member 22.

FIG. 18 is an enlarged perspective view showing a part of the first and second gas passage forming members 21, 22. As shown in FIG. 18, the gas passage forming member 21 (22) is made of a metal lath plate, which has a great number of hexagonal ring portions 21a (22a) arranged alternately. Each ring portion 21a (22a) has a through hole 21b (22b). The ring portions 21a (22a) and the through holes 21b (22b) form gas passages 21c (22c) that meander in a complex manner. Fuel gas (oxidation gas) flows through gas passages 21c (22c) as indicated by arrows.

As shown in FIG. 17, the frames 13, 14 form a supply passage G1 and a discharge passage G2 for fuel gas. The fuel gas supply passage G1 is used for supplying hydrogen gas, which serves as fuel gas, to the gas passages 21c of the first gas passage forming member 21. The fuel gas discharge passage G2 is used for discharging fuel gas that has passed through the gas passages 21c of the first gas passage forming member 21, or fuel off-gas, to the outside.

Also, the frames 13, 14 form a supply passage and a discharge passage for oxidation gas. The oxidation gas supply passage is located at a position corresponding to the back side of the sheet of FIG. 17, and is used for supplying air serving as oxidation gas to the gas passages of the second gas passage forming member 22. The oxidation gas discharge passage is located at a position corresponding to the front side of the sheet of FIG. 17, and is used for discharging oxidation gas that has passed through the gas passages of the second gas passage forming member 22, or oxidation off-gas, to the outside.

As indicated by arrow P in FIG. 17, hydrogen gas is supplied from a hydrogen gas supply source to the first gas passage forming member 21 via the supply passage G1. The air is fed from an air supply source to the second gas passage forming member 22. This causes an electrochemical reaction in each power generation cell to generate power. Since humidifiers (not shown) humidify the hydrogen gas and the oxidation gas, the gases each contain humidifying water (water vapor). The aforementioned electrochemical reaction also produces water in the electrode layer 18 at the cathode side, the gas diffusion layer 20, and the second gas passage forming member 22. The generated water and the humidifying water form water droplets W1 in a portion of the power generation cell 12 at the cathode side. The oxidation off-gas flowing in the gas passage 22a of the gas passage forming member 22 sends the water droplets W1 to the exterior via the discharge passage.

Some of the generated water seeps as seepage water through the solid electrolyte membrane 16 and flows into the electrode layer 17 at the anode side, the gas diffusion layer 19, and the gas passage 21c of the first gas passage forming member 21. The seepage water and the humidifying water form water droplets W in a portion of the power generation cell 12 at the anode side. The oxidation off-gas flowing in the gas passage 21c of the gas passage forming member 21 introduces the water droplets W to the exterior through the discharge passage G2. Patent Document 1 discloses a power generation cell for a fuel cell having the structure shown in FIG. 17.

FIG. 19 is a partial cross-sectional view showing a fuel cell disclosed in Patent Document 2. As illustrated in FIG. 19, the fuel cell has a cathode 49 and a separator 50 that are arranged in a stacked manner. The separator 50 includes a plurality of projections 50a projecting toward the cathode 49. The separator 50 and the cathode 49 form gas passages 52. A deformed member 51 is arranged around each of the projections 50a. Two ends of the deformed member 51 are bent toward the corresponding projection 50a in such a manner as to form obtuse angles R with respect to the cathode 49. As a result, each adjacent pair of walls determining the cross-sectional area of each gas passage 52 form an obtuse angle. This makes it difficult for water droplets to be accumulated in corners of the gas passages 52, thus improving drainage performance of the separator 50.

Patent Document 1: Japanese Laid-Open Patent Publication No. 2007-87768
Patent Document 2: Japanese Laid-Open Patent Publication No. 2008-21523

SUMMARY OF THE INVENTION

Problems that the Invention is to Solve

As illustrated in FIG. 18, the first gas passage forming member 21 is made of a metal lath plate, which has a great number of hexagonal ring portions 21a arranged alternately. Fuel gas flows through gas passage 21c formed by the ring portions 21a and the through holes 21b. In this configuration, the seepage water is likely to adhere to the wall surfaces of the gas passage, which meanders in an complex manner, due to surface tension. This may cause the water droplets W to remain in the gas passage 21c of the first gas passage forming member 21 without being drained to the exterior. As a result, the problems described below may occur.

Specifically, if the water droplets W remain in the gas passages 21c, 22c of the first and second gas passage forming members 21, 22 for a long time, the water droplets W degrade the solid electrolyte membrane 16 of the electrode structure 15, thus shortening the life of the power generation cell.

The remaining water droplets W may cause an abnormal (excessive) electric potential in the electrode layer 17 at the anode side. This ionizes platinum (catalyst) in the electrode layer 18 at the cathode side and the ionized platinum flows out from the electrode layer 18, thus decreasing the durability of the power generation cell.

The water droplets W contain impurities such as silicon (Si). If the impurities adhere to fibers forming the gas diffusion layers 19, 20, such as carbon fibers, like water stain, the gas diffusion effect is decreased and thus the power generation efficiency is reduced.

If the water droplets W are not sufficiently drained from the gas passage 21c of the first gas passage forming member 21 when the fuel cell operates under a high load, fuel gas supply to the electrode structure 15 may be hampered by the water droplets W and thus fall short of a sufficient level. Also, the water droplets W, which hamper power generation, may move irregularly, thus varying the voltage of the power generation. This may cause flatting and decrease the voltage stability.

The water droplets W remaining in the gas passages 21c, 22c of the first and second gas passage forming members 21, 22 reduce the cross-sectional areas of the gas passages 21c, 22c. This increases pressure loss in the fuel gas and the oxidation gas, thus increasing power loss in gas supply devices for supplying fuel gas and oxidation gas, such as compressors. The power generation efficiency of the fuel cell is thus lowered.

In some cases, most droplets are drained from the gas passages 21c, 22c of the first and second gas passage forming members 21, 22, thus drying the power generation cell 12. In these cases, the fuel gas and the oxidant gas are not sufficiently humidified and thus the electrode structure 15 and the gas diffusion layers 19, 20 deteriorate. As a result, the durability of the power generation cell 12 is decreased.

The fuel cell disclosed in Patent Document 2 improves the drainage performance of each gas passage 52. However, the fuel cell includes an increased number of components, thus making it impossible to simplify the configuration of the fuel cell. Also, as illustrated in FIG. 19, the bottom surface area of each deformed member 51 is greater than the bottom surface area of each projection 50a. Arranging the deformed members 51 thus increases the surface area of the cathode 49 that is insulated from the gas passages 52. This decreases the cross-sectional area by which the gas is supplied to the cathode 49, thus reducing the power generation efficiency.

Accordingly, it is an objective of the present invention to provide a gas passage forming member for a fuel cell, a method for manufacturing the gas passage forming member, and a forming device for forming the gas passage forming member that improve durability, voltage stability, and power generation efficiency of the fuel cell by solving the problems in the above-described conventional techniques.

Means for Solving the Problems

To achieve the foregoing objective and in accordance with one aspect of the present invention, a gas passage forming member for use in a fuel cell is provided. The fuel cell includes an electrode layer, a gas diffusion layer formed on a surface of the electrode layer, and a separator facing the gas diffusion layer, and generates electric power through electrode reaction in the electrode layer. A gas passage is formed between the gas diffusion layer and the separator to supply fuel gas or oxidant gas to the electrode layer. The gas passage forming member is configured by a metal lath formed by a thin metal plate. A plurality of ring portions each having a through hole having a prescribed form are formed in the gas passage forming member and arranged in a grid-like shape. The ring portions are connected together through linking plate portions. Each of the linking plate portions is inclined with respect to a flow direction of the gas. Each linking plate portion includes a first inclined plate portion held in contact with a backside of the separator and a second inclined plate portion held in contact with a surface of the gas diffusion layer. A first inclination angle, which is the angle between the first inclined plate portion and the separator, is set smaller than a second inclination angle, which is the angle between the second inclined plate portion and the gas diffusion layer.

According to the present invention, the first inclination angle and the second inclination angle are both preferably set to an acute angle.

Further, it is preferable that: each of the ring portions of the gas passage forming member have a first semi-ring portion and a second semi-ring portion; the first semi-ring portion be held in contact with the backside of the separator and including the first inclined plate portion; and the second semi-ring portion be held in contact with the surface of the gas diffusion layer and including the second inclined plate portion. Also, it is preferable that a pair of third inclined plate portions be formed in the first semi-ring portion at the left and right sides of the first inclined plate portion as viewed in the flow direction of the gas, and a pair of fourth inclined plate portions be formed in the second semi-ring portion at the left and right sides of the second inclined plate portion as viewed in the flow direction of the gas. It is further preferable that a third inclination angle, which is the angle between the separator and each of the third inclined plate portions, be set smaller than a fourth inclination angle, which is the angle between the gas diffusion layer and each of the fourth inclined plate portions.

The third inclination angle and the fourth inclination angle are both preferably set to an acute angle.

The second inclined plate portion preferably has a flat surface portion that is held in surface contact with the surface of the gas diffusion layer.

In accordance with another aspect of the present invention, a method for manufacturing a gas passage forming member is provided that includes: a first step of forming, in the thin metal plate, the first semi-ring portions and the second semi-ring portions alternately and forming the first inclined plate portions and the second inclined plate portions alternately; a second step, following the first step, of moving the thin metal plate in an offset manner by a predetermined pitch in a direction perpendicular to a feed direction of the thin metal plate, and then forming the through holes and the ring portions in the thin metal plate by processing the thin metal plate in the same manner as in the first step; and a step of alternately repeating the first step and the second step.

According to the present embodiment, it is preferable that the first step and the second step include a step of forming the third inclined plate portions and the fourth inclined plate portions.

The method preferably includes a step of forming, in the second inclined plate portion of each linking plate portion connecting the corresponding ring portions, a flat surface portion that is held in surface contact with the surface of the gas diffusion layer.

In accordance with a further aspect of the present invention, a forming device used in the method for manufacturing the gas passage forming member is provided. The forming device includes a first cutting die, a second cutting die, and a first forming surface. The first cutting die has recesses and projections that are arranged alternately at a predetermined pitch. The second cutting die has projections and recesses that are engageable with the recesses and the projections of the first cutting die, respectively, and arranged alternately at a predetermined pitch. The ring portions is formed in a meandering manner by reciprocating the first and second cutting dies in the direction of the thickness and the direction of the width of the thin metal plate to cause engagement between the recesses and the projections of the first cutting die and the corresponding projections and the corresponding recesses of the second cutting die in such a manner as to form a plurality of cut lines in the thin metal plate at a predetermined pitch and bend and stretch the thin metal plate. The first forming surface is formed on a top surface of each of the projections of the first cutting die. The first forming surface is inclined downward as viewed in the feed direction of the thin metal plate. The forming surface forms the first inclined plate portion in the linking plate portion of each ring portion.

According to the present invention, a pair of third forming surfaces for forming the third inclined plate portions in a top portion of the first semi-ring portion are preferably formed at the left and right sides of each projection of the first cutting die as viewed in the feed direction of the thin metal plate. Also, a pair of fourth forming surfaces for forming the fourth inclined plate portions in a top portion of the second semi-ring portion are preferably formed at the left and right sides of each recess of the first cutting die as viewed in the feed direction of the thin metal plate.

The forming device preferably includes a first forming roller and a second forming roller having a diameter greater than the diameter of the first forming roller. It is preferable that; the clearance between the first forming roller and the second forming roller is set to a value smaller than the thickness of the metal lath; and when the metal lath is moved between the first and second forming rollers in such a manner that the second inclined plate portions face the first forming roller and the first inclined plate portions face the second forming roller, the distal edges of the second inclined plate portions of the linking plate portions are deformed by using the first forming roller with the number of the distal edges of the second inclined plate portions that contact the outer peripheral surface of the first forming roller smaller than the number of the distal edge of the first inclined plate portions that contact the outer peripheral surface of the second forming roller, such that a flat surface portion that is held in surface contact with the surface of the gas diffusion layer is formed in the distal edges of the second inclined plate portions.

(Operation)

In the present invention, the first inclination angle, which is the angle between the first inclined plate portion in the linking plate portion of each ring portion of the gas passage forming member that contacts the backside of the separator and the separator, is set smaller than the second inclination angle, which is the angle between the second inclined plate portion in the linking plate portion that contacts the surface of the diffusion layer and the diffusion layer. This causes water droplets generated in the gas passage formed by the gas passage forming member to be drawn from the gap with a great inclination angle between the second inclined plate portion and the electrode layer into the small wedge-formed gap between the separator and the first inclined plate portion through capillary action brought about by the small wedge-shaped gap. The water droplets are thus prevented from remaining at a position close to the electrode layer. As a result, the fuel gas or the oxidant gas is adequately supplied from the gas passage formed by the gas passage forming member to the electrode layer without being interfered by water droplets. This ensures adequate power generation and prevents deterioration of the electrode layer caused by water droplets.

Effects of the Invention

The present invention improves durability and voltage stability and increases power generation efficiency.

DETAILED DESCRIPTION OF THE INVENTION

A preferred embodiment of the present invention will now be described with reference to FIGS. 1 to 12.

Figure 1:
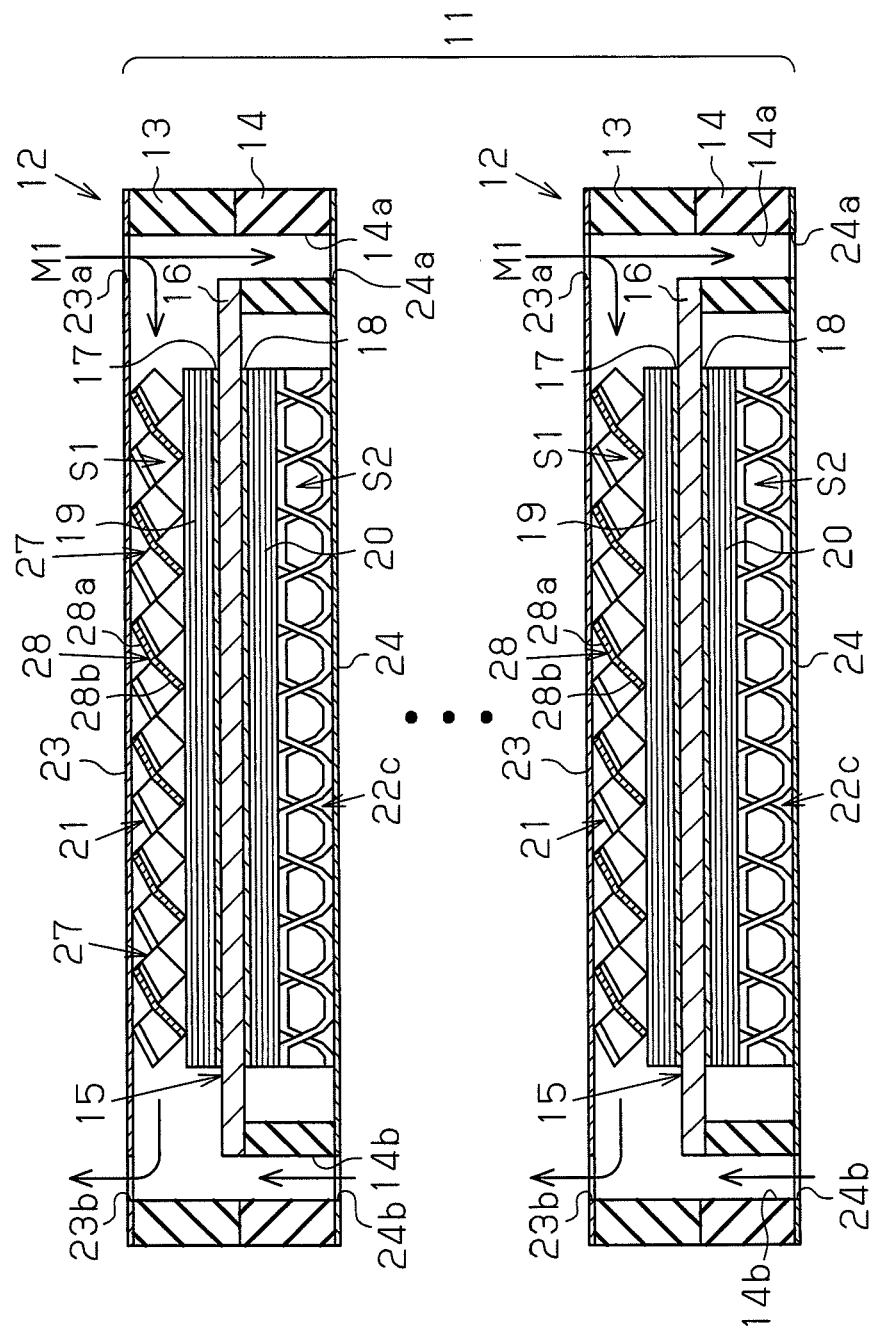
FIG. 1 is a longitudinal partial cross-sectional view showing a fuel cell stack having a gas passage forming member of the present invention.

As shown in FIG. 1, a fuel cell stack 11 of the present embodiment is a solid polymer type, and is formed by a number of stacked power generation cells 12.

Figure 2:
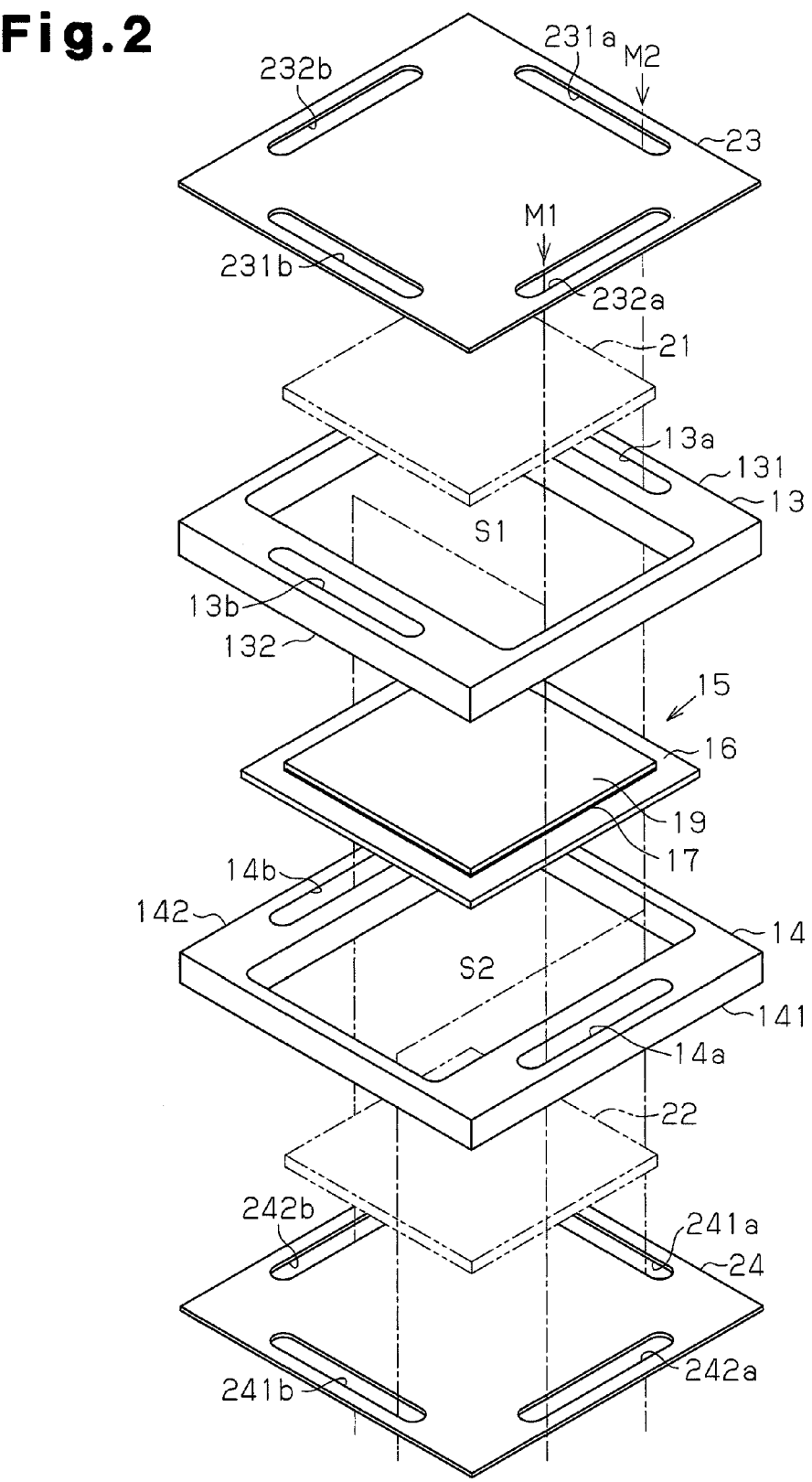
FIG. 2 is an exploded perspective view showing components of the power generation cell.

As shown in FIGS. 1 and 2, each power generation cell 12 is shaped like a rectangular frame and includes first and second frames 13, 14 made of synthetic rubber (or synthetic resin) and a membrane electrode assembly (MEA) 15, which serves as an electrode structure. The first frame 13 defines in it a passage space S1 for fuel gas, and the second frame 14 defines in it a passage space S2 for oxidant gas. The MEA 15 is arranged between the frames 13, 14.

The power generation cell 12 has a first gas passage forming member 21, which is formed by titanium accommodated in the passage space S1 for fuel gas, and a second gas passage forming member 22, which is formed by titanium accommodated in the oxidant gas passage space S2. Further, the power generation cell 12 has a flat plate-shaped first separator 23 and a second separator 24, which are made of titanium. The first separator 23 is bonded to the upper surfaces of the first frame 13 and the first gas passage forming member 21 as viewed in the drawing. The second separator 24 is bonded to the lower surfaces of the second frame 14 and the second gas passage forming member 22 as viewed in the drawing. In FIG. 2, the gas passage forming members 21, 22 are illustrated as flat plates in a simplified manner.

A gas passage 13a and a gas passage 13b each shaped like an elongated hole are formed in a side 131 and an opposing side 132, respectively. A gas passage 14a and a gas passage 14b are formed in a side 141 and a side 142, respectively, which are perpendicular to the sides 131, 132 in the second frame 14.

The MEA 15 is configured by an electrolyte membrane 16, an anode layer 17, and a cathode layer 18, as illustrated in FIGS. 1 and 2. The anode layer 17 is formed of a catalyst that is laid on the anode-side surface of the electrolyte membrane 16, that is, on the upper surface as viewed in the drawing. The cathode layer 18 is formed of a catalyst that is laid on the cathode-side surface of the electrolyte membrane 16, that is, on the lower surface as viewed in the drawing. A gas diffusion layer 19 and a gas diffusion layer 20, which are formed by conductive carbon paper sheets, are bonded to a surface of the electrode layer 17 and a surface of the electrode layer 18, respectively.

A gas inlet port 231a and a gas inlet port 232a are formed in the two sides of the first separator 23 corresponding to the side 131 of the first frame 13 and the side 141 of the second frame 14, respectively. A gas outlet port 231b and a gas outlet port 232b are formed in the other two sides of the first separator 23. A gas inlet port 241a and a gas inlet port 242a are formed in the two sides of the second separator 24 corresponding to the gas inlet ports 231a, 232a, respectively. A gas outlet port 241b and a gas outlet port 242b are formed in the other two sides of the second separator 24.

The first gas passage forming member 21 and the second gas passage forming member 22 are received in a fuel gas passage space S1 in the first frame 13 and an oxidant gas passage space S2 in the second frame 14, respectively. The first gas passage forming member 21 is held in contact with a surface of the gas diffusion layer 19 and an inner surface of the first separator 23. The second gas passage forming member 22 is held in contact with a surface of the gas diffusion layer 20 and an inner surface of the second separator 24.

As indicated by arrow M1 in FIG. 2, after fuel gas is introduced from the gas inlet port 232a of the first separator 23 into the fuel gas passage space S1, the first gas passage forming member 21 sends the fuel gas to the gas outlet port 232b, the gas outlet port 242b of the second separator 24, and the gas passage 14b of the second frame 14. As indicated by arrow M2 in the drawing, after the oxidant gas is introduced from the gas inlet port 231a of the first separator 23 into the oxidant gas passage space S2 through the gas passage 13a of the first frame 13, the second gas passage forming member 22 sends the oxidant gas to the gas outlet port 231b through the gas passage 13b of the first frame 13 or to the gas outlet port 24b of the second separator 24.

In the illustrated embodiment, the first and second frames 13, 14 are molded from synthetic rubber. This enhances the sealing performance with respect to the gas in the contact portion between the first frame 13 and the electrolyte membrane 16 and the contact portion between the first frame 13 and the second frame 14. Specifically, when the power generation cells 12 are stacked together to configure the fuel cell stack 11, fastening load produced by the fuel cell stack 11 causes the first gas passage forming member 21 and the second gas passage forming member 22 to be mounted each in a state slightly pressed against the MEA 15 by the first separator 23 and the second separator 24, respectively.

Figure 3:
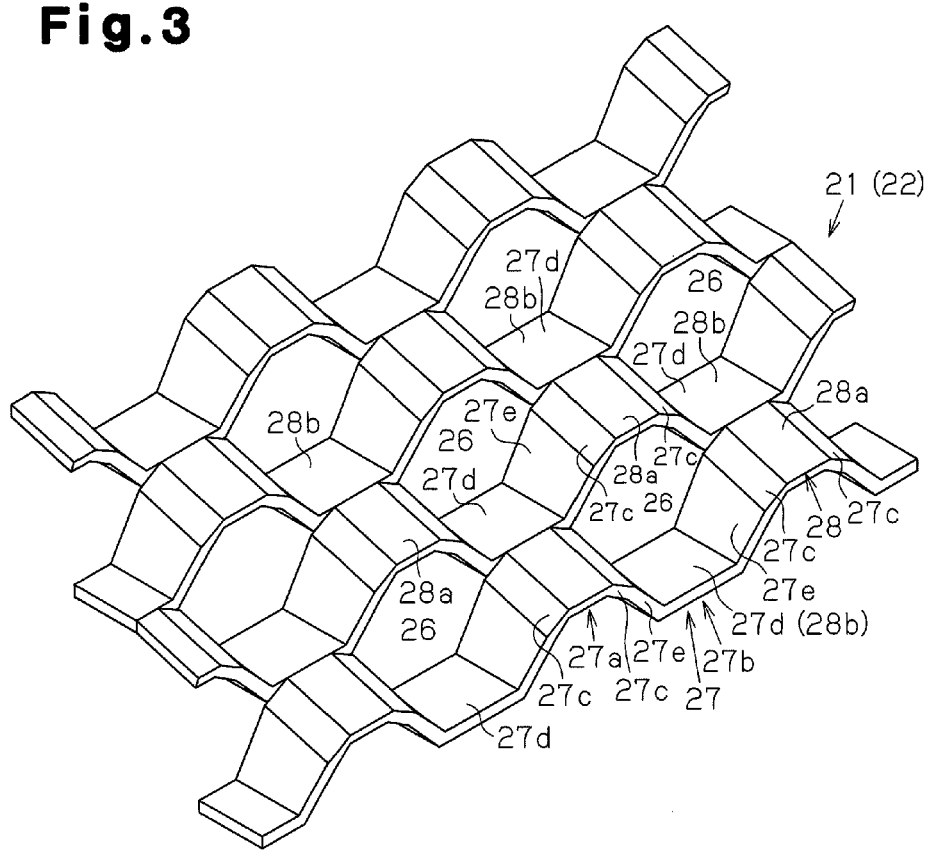
FIG. 3 is an enlarged partial perspective view showing a first gas passage forming member used in the power generation cell.
Figure 4:
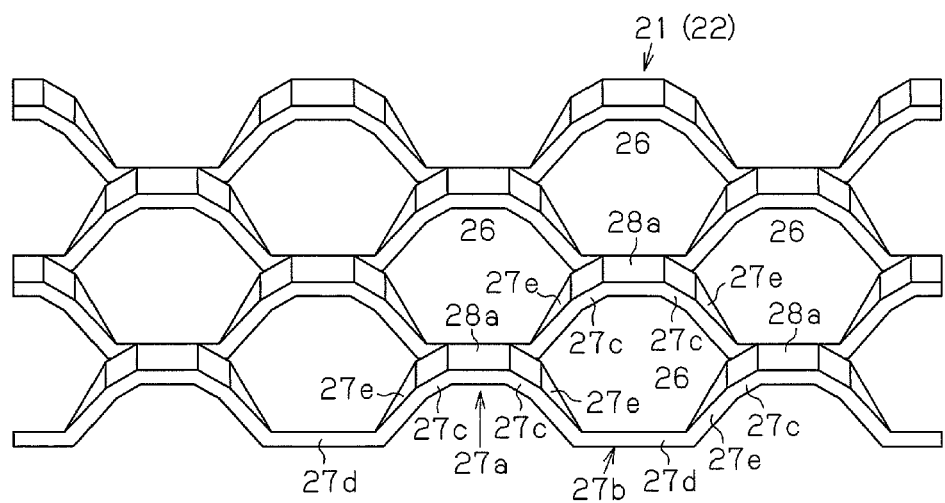
FIG. 4 is an enlarged partial plan view showing the first gas forming member.

With reference to FIGS. 3 and 4, the first and second gas passage forming members 21, 22 are configured identically and formed by a lath cut metal 25 (hereinafter, referred to simply as a metal lath) of titanium with a thickness of approximately 0.1 mm. Polygonal through holes 26 are formed in the metal lath 25 in a meandering manner.

Figure 5A:
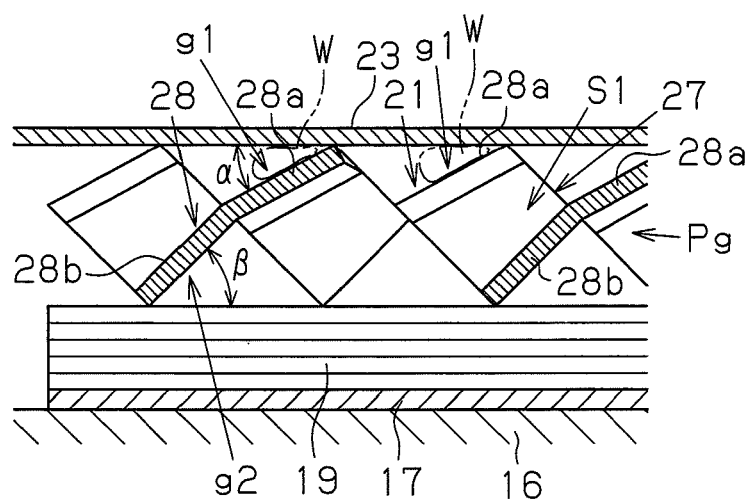
FIG. 5(a) is an enlarged partial cross-sectional view as viewed along a gas flow direction, showing an anode side gas passage in the power generation cell.

The ring portions 27, which form the through holes 26, are joined together through linking plate portions 28. With reference to FIG. 5(a), each of the linking plate portions 28 has a first inclined plate portion 28a contacting the backside of the corresponding separator 23, 24 and a second inclined plate portion 28b contacting the corresponding gas diffusion layer 19, 20. The first and second inclined plate portions 28a, 28b are inclined with respect to a gas passage direction Pg, which is a gas flow direction. The angle between each separator 23, 24 and each first inclined plate portion 28a is defined as a first inclination angle α. The angle between each gas diffusion layer 19, 20 and each second inclined plate portion 28b is defined as a second inclination angle β. The first inclination angle α is set smaller than the second inclination angle β. Both inclination angles are acute.

Figure 5B:
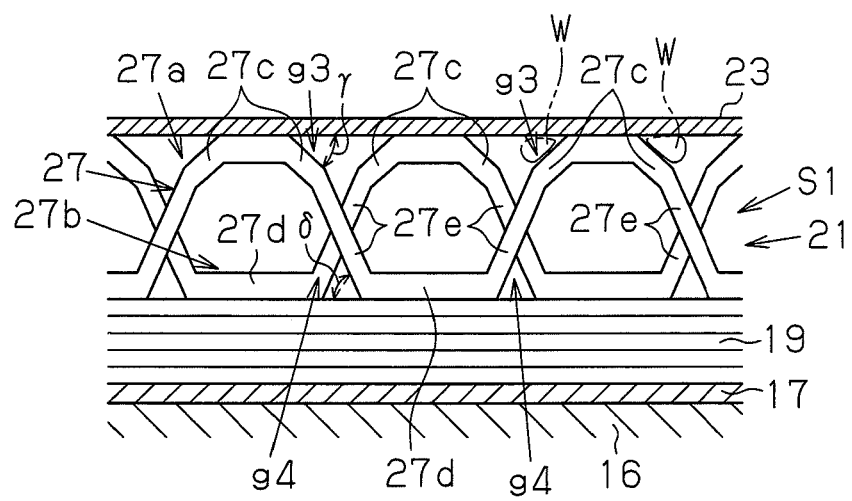
FIG. 5(b) is an enlarged partial cross-sectional view as viewed along a direction perpendicular to the gas flow direction, showing the anode side gas passage in the power generation cell.

In each of the ring portions 27, a semi-ring portion at the side corresponding to the separator 23, 24 is referred to as a first semi-ring portion 27a and a semi-ring portion at the side corresponding to the gas diffusion layer 19, 20 is referred to as a second semi-ring portion 27b. The top portion of each of the first semi-ring portions 27a is formed by the corresponding one of the first inclined plate portions 28a. The bottom portion of each of the second semi-ring portions 27b has a flat plate portion 27d, which is held in surface contact with the corresponding gas diffusion layer 19, 20. The flat plate portion 27d is formed by the corresponding second inclined plate portion 28b. With reference to FIG. 5(b), as viewed in the gas flow direction (the direction perpendicular to the sheet surface of FIG. 5(b)), a pair of third inclined plate portions 27c are formed at the left and right sides of each first inclined plate portion 28a and a pair of fourth inclined plate portions 27e are formed at the left and right sides of each second inclined plate portion 28b.

The angle between each separator 23, 24 and each third inclined plate portion 27c is defined as a third inclination angle γ. Each second inclined plate portions 28b and the corresponding third inclined plate portions 27c are joined together through a pair of left and right fourth inclined plate portions 27e. The angle between each gas diffusion layer 19, 20 and each fourth inclined plate portion 27e is defined as a fourth inclination angle δ. The third inclination angle γ is set smaller than the fourth inclination angle δ. Both inclination angles are acute.

A method for manufacturing the first and second gas passage forming members 21, 22 will hereafter be described.

Figure 7:
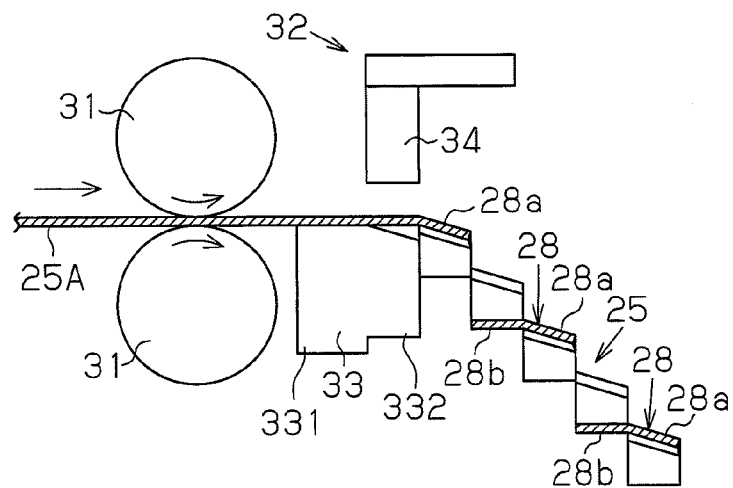
FIG. 7 is a side view schematically showing a forming device for forming the gas passage forming member.

The first gas passage forming member 21 is formed using a metal lath processing device shown in FIG. 7. The metal lath processing device has a pair of upper and lower feed rollers 31, which continuously feed a thin titanium plate 25A (material). The processing device includes a forming mechanism 32, which forms cut lines in the thin plate 25A and plastically deforms the thin plate 25A by bending and stretching the thin plate 25A. The forming mechanism 32 forms a number of polygonal through holes 26, which are arranged in a grid-like form, in the thin titanium plate 25A in a stepped manner, thus providing the metal lath 25.

As illustrated in FIG. 7, the forming mechanism 32 has a first cutting die 33 and a second cutting die 34. The first cutting die 33 is allowed to reciprocate at a predetermined height in a horizontal direction (a direction perpendicular to the sheet surface of the drawing), which is perpendicular to the feed direction of the thin titanium plate 25A, by a non-illustrated drive mechanism. The second cutting die 34 is allowed to reciprocate in an upward-downward direction and a horizontal direction (a direction perpendicular to the drawing sheet surface) by a non-illustrated drive mechanism.

Figure 8:
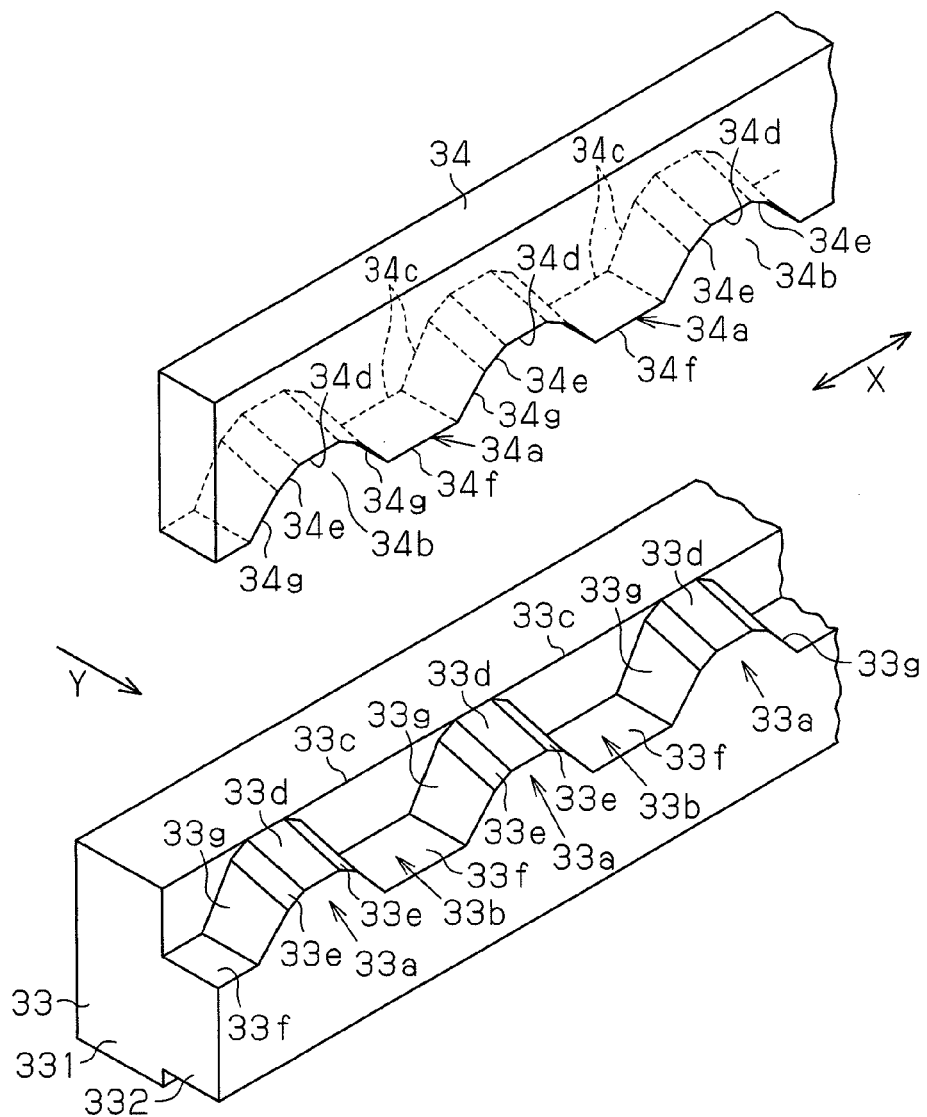
FIG. 8 is a perspective view showing a first cutting die and a second cutting die of the forming device.

With reference to FIG. 8, the first cutting die 33 is configured by an upstream portion 331 upstream in the feed direction of the thin titanium plate 25A and a downstream portion 332 downstream in the feed direction of the thin titanium plate 25A. Projections 33a and recesses 33b are formed alternately in an upper portion of the downstream portion 332 at a predetermined pitch in a horizontal direction (as indicated by arrow X). Projections 34a and recesses 34b, which are engageable with corresponding recesses 33b and corresponding projections 33a of the first cutting die 33, respectively, are formed alternately in a lower portion of the second cutting die 34 at a predetermined pitch in the horizontal direction (as indicated by arrow X). A shearing edge 33c is formed at an upper edge of a downstream side of the upstream portion 331. A shearing edge 34c is formed along the lower edges and the left and right ends of the projections 34a of the second cutting die 34 that correspond to the shearing edge 33c. The shearing edges 33c, 34c form cut lines in the thin titanium plate 25A.

A first forming surface 33d is formed on the top of each of the projections 33a of the first cutting die 33. Each one of the first forming surfaces 33d forms the first inclined plate portion 28a of the corresponding one of the ring portions 27 of the metal lath 25. As viewed in the feed direction of the thin titanium plate 25A (indicated by arrow Y), each first forming surface 33d is slanted downward. The inner top surface of each of the recesses 34b of the second cutting die 34 corresponding to the first forming surfaces 33d forms a horizontal forming surface 34d. At the left and right sides of the first forming surface 33d of each projection 33a as viewed in the feed direction of the thin titanium plate 25A, a pair of third forming surfaces 33e are formed integrally with the first forming surface 33d. Each pair of the third forming surfaces 33e form the third inclined plate portions 27c of the corresponding one of the first semi-ring portions 27a. As viewed horizontally from each first forming surface 33d, the associated third forming surfaces 33e are inclined downward. Third forming surface 34e corresponding to the third forming surfaces 33e are formed on the left and right surfaces of each recess 34b of the second cutting die 34. The third forming surfaces 34e are slanted in the same directions as the corresponding third forming surfaces 33e.

A second forming surface 33f is formed on the bottom surface of each recess 33b of the first cutting die 33. Each one of the second forming surfaces 33f forms the second inclined plate portion 28b of the corresponding one of the second semi-ring portions 27b. The second forming surfaces 33f are horizontal. A horizontal second forming surface 34f corresponding to each second forming surface 33f is formed on the top surface of the associated projection 34a of the second cutting die 34.

A pair of fourth forming surfaces 33g are formed at the left and right sides of the second forming surface 33f of each recess 33b as viewed in the feed direction of the thin titanium plate 25A. Each one of the fourth forming surfaces 33g connects the associated one of the second forming surfaces 33f to the corresponding one of the third forming surfaces 33e. The fourth forming surfaces 33g form the fourth inclined plate portions 27e of each second semi-ring portion 27b. As viewed horizontally from each third forming surface 33e, the corresponding fourth forming surface 33g is slanted downward. A fourth forming surface 34g parallel to the corresponding fourth forming surface 33g of the first cutting die 33 is formed in each projection 34a of the second cutting die 34 and between the corresponding forming surface 34d and the associated second forming surface 34f in corresponding with the fourth forming surface 33g.

Operation for forming the metal lath 25 using the forming device illustrated in FIGS. 7 and 8 will now be described with reference mainly to FIGS. 9 to 12.

Figure 9A:
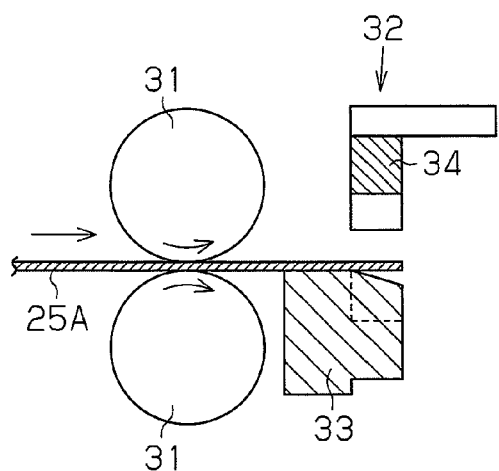
FIG. 9(a) is a partial side view illustrating operation of the forming device.
Figure 9B:
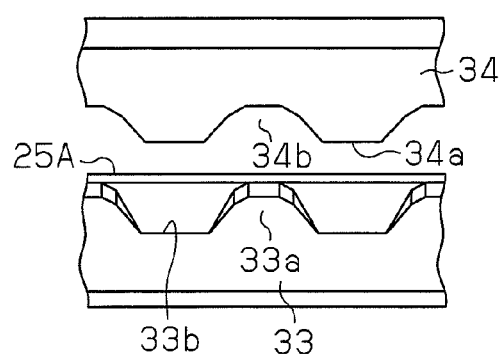
FIG. 9(b) is a partial front view illustrating operation of the forming device.

As illustrated in FIGS. 9(a) and 9(b), the feed rollers 31 feed the distal portion of the thin titanium plate 25A into the clearance between the first cutting die 33 and the second cutting die 34 by a predetermined processing pitch. In this state, the second cutting die 34 is lowered toward the first cutting die 33, or, in other words, the second cutting die 34 is driven in the direction of the thickness of the thin titanium plate 25A. This causes the shearing edge 33c of the first cutting die 33 and the shearing edge 34c of the second cutting die 34 to shear a portion of the thin titanium plate 25A, thus forming a plurality of cut lines.

Figure 10A:
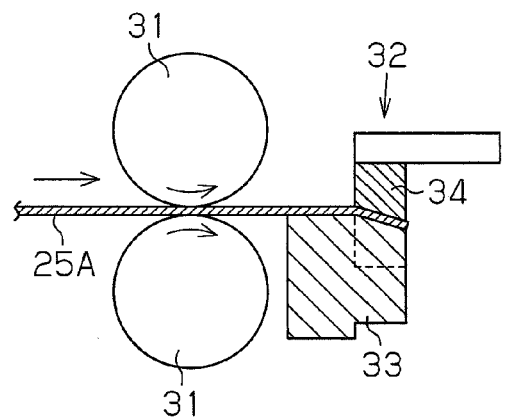
FIG. 10(a) is a partial side view illustrating operation of the forming device.
Figure 10B:
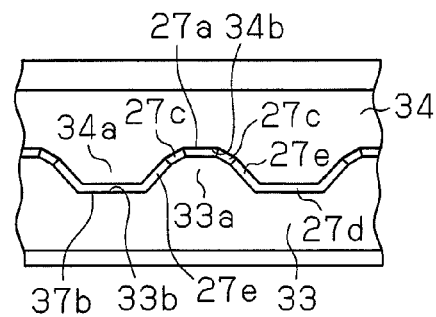
FIG. 10(b) is a partial front view illustrating operation of the forming device.
Figure 11:
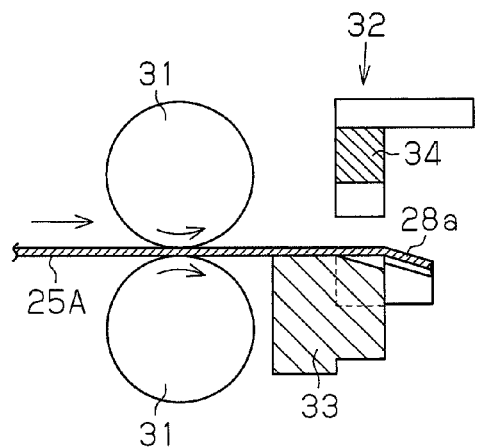
FIG. 11(a) is a partial side view illustrating operation of the forming device.
FIG. 11(b) is a partial front view illustrating operation of the forming device.
Figure 11:
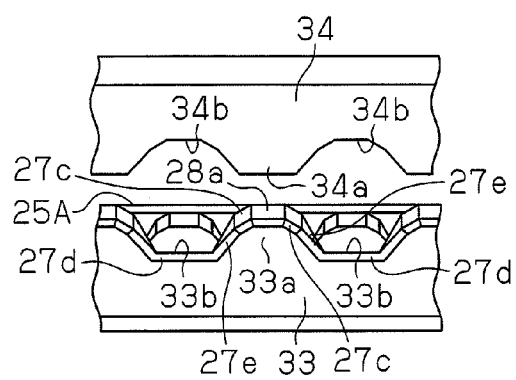
Figure 12:
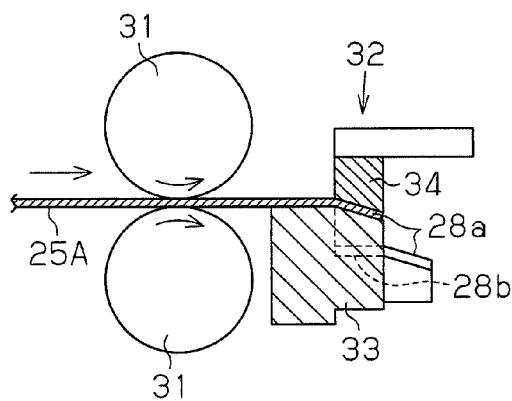
FIG. 12(a) is a partial side view illustrating operation of the forming device.
FIG. 12(b) is a partial front view illustrating operation of the forming device.
Figure 12:
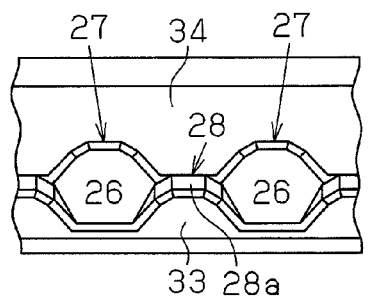

Subsequently, as illustrated in FIG. 10(a), the second cutting die 34 is lowered to the lowermost position and the portion of the thin titanium plate 25A in contact with the projections 34a of the second cutting die 34 are bent and stretched downward. With reference to FIG. 10(b), the bent and stretched portions substantially form U shapes. In the thin titanium plate 25A, the first semi-ring portions 27a, the second semi-ring portions 27b, the first inclined plate portions 28a, the second inclined plate portions 28b, the third inclined plate portions 27c, and the fourth inclined plate portions 27e are formed alternately at a predetermined pitch. Afterwards, the second cutting die 34 is returned from the lowermost position to the original position, which is located upward, as illustrated in FIG. 11(a).

Then, as illustrated in FIG. 11(a), the feed rollers 31 feed the thin titanium plate 25A to the forming mechanism 32 by the predetermined processing pitch. Synchronously, with reference to FIG. 11(b), the first cutting die 33 and the second cutting die 34 are moved by a half alignment pitch (a half pitch) of the first semi-ring portions 27a and the second semi-ring portions 27b in the rightward (or leftward) direction, or, in other words, the direction of the width of the thin titanium plate 25A. The second cutting die 34 is then lowered as illustrated in FIGS. 12(a) and 12(b). In this manner, cut line formation, bending and stretching are performed on the thin titanium plate 25A at the position offset from the previously bent and stretched portion by the half pitch in the rightward (or leftward) direction. As a result, the through holes 26 and the ring portions 27 are formed.

By repeating the above-described operation, the thin titanium plate 25A is formed into a metal lath 25. As illustrated in FIGS. 3 and 4, a number of through holes 26 and ring portions 27, which are arranged in a grid-like shape, are formed in the metal lath 25. Specifically, the projections 33a and the recesses 33b of the first cutting die 33 are engaged with the corresponding recesses 34b and the corresponding projections 34a of the second cutting die 34, respectively. Accordingly, as the second cutting die 34 is lowered, a portion free from a cut line remains in the metal lath 25. The cut-line free portion forms the linking plate portions 28. As a result, the ring portions 27 are connected together sequentially in an overlapping manner. The metal lath 25 thus has a cross section formed in a stepped manner as illustrated in FIGS. 3 and 7.

Operation of the fuel cell stack 11 configured in the above-described manner will now be described.

In the fuel cell stack 11, the gas inlet ports 232a of the first separators 23 and the gas inlet ports 242a of the second separators 24 of the stacked power generation cells 12 all communicate with one another through the fuel gas passage spaces S1 of the first frames 13 and the gas passages 14a of the second frames 14. The gas inlet ports 232a, the gas inlet ports 242a, the passage spaces S1, and the gas passages 14a define a fuel gas (hydrogen gas) passage.

The gas inlet ports 231a of the first separators 23 and the gas inlet ports 241a of the second separators 24 all communicate with one another through the gas passages 13b of the first frames 13 and the oxidant gas passage spaces S2 of the second frames 14. The gas inlet ports 231a, the gas inlet ports 241a, the gas passages 13a, and the oxidant gas passage spaces S2 define the oxidant gas (air) passage.

After having been supplied to the fuel gas passage, the fuel gas is uniformly diffused in the gas passage space S1 by means of the first gas passage forming member 21. After having been sent to the oxidant gas passage, the oxidant gas is uniformly diffused in the oxidant gas passage space S2 by means of the second gas passage forming member 22. Specifically, the fuel gas (the oxidant gas) in the fuel gas passage space S1 (the oxidant gas passage space S2) passes through the multiple through holes 26 formed in the first gas passage forming member 21 (the second gas passage forming member 22) and thus causes a turbulent flow. This uniformly diffuses the fuel gas (the oxidant gas) in the gas passage space S1 (the oxidant gas passage space S2). The fuel gas (the oxidant gas) then flows through the gas diffusion layer 19 and is thus adequately diffused and uniformly supplied to the anode layer 17 (the cathode layer 18). The supplied fuel gas and oxidant gas cause electrode reaction in the MEA 15 to generate power. As a result, the fuel cell stack 11, which is configured by the stacked multiple power generation cells 12, outputs a predetermined level of power.

As illustrated in FIG. 5(a), the angle $\alpha$ between the separator 23 and each first inclined plate portion 28a is smaller than the angle $\beta$ between each second inclined plate portion 28b and the gas diffusion layer 19. The gap g1 between the separator 23 and the first inclined plate portion 28a is narrower than the gap g2 between the second inclined plate portion 28b and the gas diffusion layer 19. Accordingly, when water droplets W are generated in the gas passage in the first gas passage forming member 21, the water droplets W tend to be drawn into the gap g1 through capillary action of the gap g1, which is shaped like a wedge. This substantially prevents the water droplets W from remaining at a position close to the gas diffusion layer 19. The fuel gas is thus prevented from being interfered with by the water droplets W and adequately supplied from the gas passage in the gas passage forming member 21 to the gas diffusion layer 19 and the electrode layer 17. As a result, the power is generated adequately and the gas diffusion layer 19 and the electrode layer 17 are prevented from being degraded by water droplets.

As illustrated in FIG. 5(b), the angle $\gamma$ between the separator 23 and each third inclined plate portion 27c is smaller than the angle $\delta$ between each fourth inclined plate portion 27e and the gas diffusion layer 20. The gap g3 between the separator 23 and the third inclined plate portion 27c is narrower than the gap g4 between the fourth inclined plate portion 27e and the gas diffusion layer 20. Accordingly, when water droplets W are generated in the gas passage in the first gas passage forming member 21, the water droplets W tend to be drawn into the gap g3 through capillary action of the gap g3, which is shaped like a wedge. This substantially prevents the water droplets W from remaining at a position close to the gas diffusion layer 19. The fuel gas is thus prevented from being interfered with by the water droplets W and adequately supplied from the gas passage in the gas passage forming member 21 to the gas diffusion layer 19 and the electrode layer 17. As a result, the power is generated adequately and the electrode structure 15 and the gas diffusion layer 19 are prevented from being degraded by water droplets.

Figure 6A:
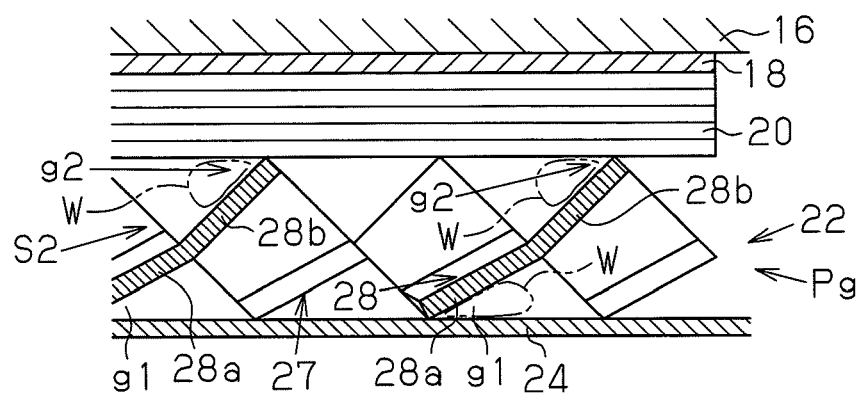
FIG. 6(a) is an enlarged partial cross-sectional view as viewed along a gas flow direction, showing a cathode side gas passage in the power generation cell.
Figure 6B:
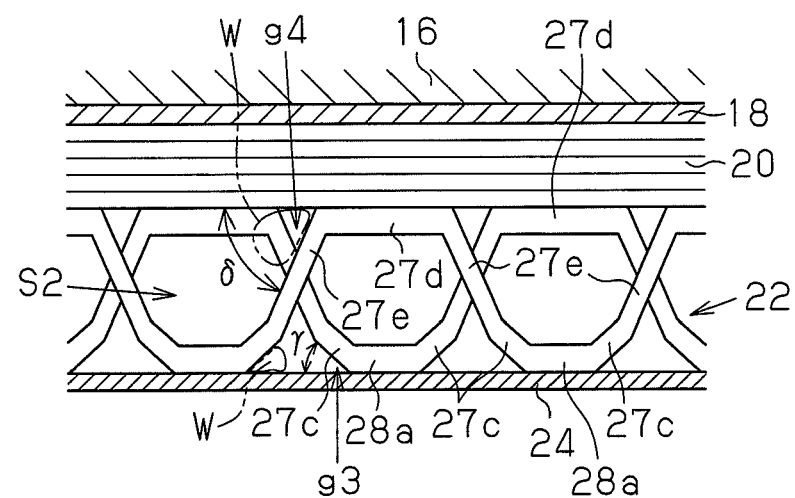
FIG. 6(b) is an enlarged partial cross-sectional view as viewed along a direction perpendicular to the gas flow direction, showing the cathode side gas passage in the power generation cell.

In the cathode side gas passage forming member 22, water droplets W in the gap g2 or the gap g4 are drawn into the gap g1 or the gap g3 through the capillary action as illustrated in FIGS. 6(a) and 6(b), as in the case of the above-described operation of the anode side gas passage forming member 21.

The first and second gas passage forming members 21, 22 of the illustrated embodiment has the advantages described below.

(1) In the above illustrated embodiment, the first and second gas passage forming members 21, 22 are formed using the metal lath 25. The angle $\alpha$ between the backside of each separator 23, 24 and the first inclined plate portion 28a is set smaller than the angle $\beta$ between the surface of the gas diffusion layer 19 and the second inclined plate portion 28b. This allows water droplets W generated in the gas passage formed by the gas passage forming member 21, 22 to be drawn into the gap g1 between the first inclined plate portion 28a and the separator 23, 24 through the capillary action. As a result, the fuel gas and the oxidant gas are adequately supplied to the gas diffusion layers 19, 20. This prevents the gas diffusion layers 19, 20 and the electrode layers 17, 18 from being degraded by the water droplets W and improves the power generation efficiency.

(2) In the above illustrated embodiment, the angle $\delta$ between each fourth inclined plate portion 27e of the second semi-ring portion 27b and each separator 23, 24 is set smaller than the angle $\gamma$ between each third inclined plate portion 27c of the first semi-ring portion 27a and each gas diffusion layer 19, 20. This allows water droplets W to be drawn from the gap between the gas diffusion layer 19, 20 and the fourth inclined plate portion 27e into the wedge-formed gap between the third inclined plate portion 27c and the separator 23, 24 through the capillary action. As a result, the water droplets W are further effectively prevented from remaining at a position close to the gas diffusion layer 19, 20.

(3) In the above illustrated embodiment, water droplets W are held in a number of gaps g2 and gaps g4 at the side close to the separators 23, 24 in the gas passage forming members 21, 22 in a uniform and appropriate manner. The water droplets W, which are maintained in the uniform and appropriate manner, humidify the interior of each power generation cell 12 to an appropriate extent and thus prevent drying. This increases humidity in the fuel gas and the oxidant gas, thus preventing deterioration of the electrode structure 15 and the gas diffusion layers 19, 20. As a result, each power generation cell 12 exhibits improved durability.

(4) In the above illustrated embodiment, in the linking plate portion 28 of each gas passage forming member 21, 22, the first inclined plate portion 28a and the second inclined plate portion 28b are formed through bending. This prevents the number of the components from increasing and simplifies the configuration. Also, since there is no accessory for the gas passage forming members 21, 22, the effective surface area of each gas diffusion layer 19, 20 is increased to raise the supply amount of the gas. This improves the power generation efficiency.

(5) In the above illustrated embodiment, the first and second inclined plate portions 28a, 28b of each linking plate portion 28 are bent by the metal lath forming device. Accordingly, when the metal lath 25 is formed, the first inclined plate portions 28a are formed simultaneously, thus facilitating manufacture.

The above embodiment may be modified as follows.

Figure 13:
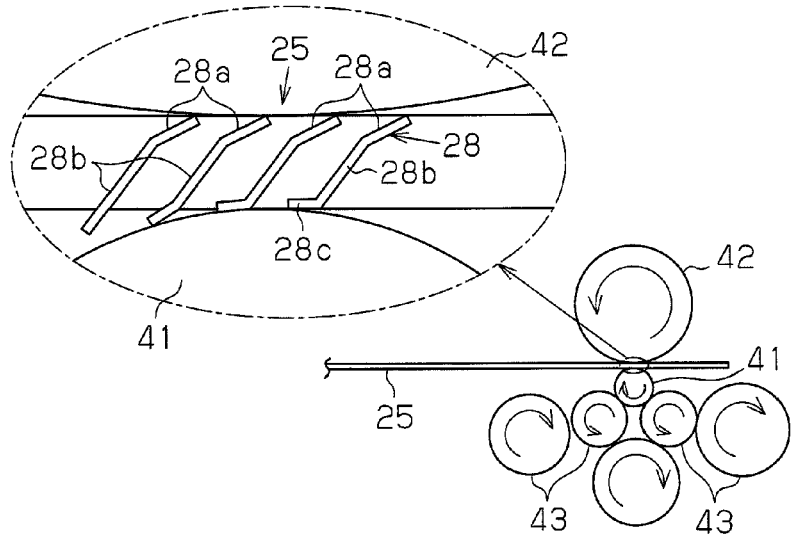
FIG. 13 is a side view schematically showing a flat portion forming device used in another embodiment of the present invention.

A flat surface portion held in surface contact with the gas diffusion layer may be formed at the distal edge of the second inclined plate portion 28b of each linking plate portion 28. To form the flat surface portions, a forming device for a gas passage forming member further including, as illustrated in FIG. 13, a first forming roller 41 and a second forming roller 42 having a diameter greater than the diameter of the first forming roller 41 for forming the metal lath 25 may be employed. The clearance between the first and second forming rollers 41, 42 is set smaller than the thickness of the metal lath 25. The forming roller 41 is supported by a plurality of backup rollers 43.

As the metal lath 25 proceeds between the first and second forming rollers 41, 42, distal edges of a plurality of first inclined plate portions 28a come into contact with the outer peripheral surface of the second forming roller 42. A second inclined plate portion (second inclined plate portions) 28b of a number (for example, one) smaller than the number of the distal edges of the first inclined plate portions 28a that contact the outer peripheral surface of the second forming roller 42 contact the outer peripheral surface of the first forming roller 41. Accordingly, the distal edge of the second inclined plate portions 28b that contact the outer peripheral surface of the first forming roller 41 receives relatively great pressing force. However, the distal ends of the first inclined plate portions 28a that contact the outer peripheral surface of the second forming roller 42 receive relatively small pressing force. As a result, only the distal edge of the second inclined plate portion 28b is bent by the forming roller 41 to form a flat surface portion 28c.

Figure 14:
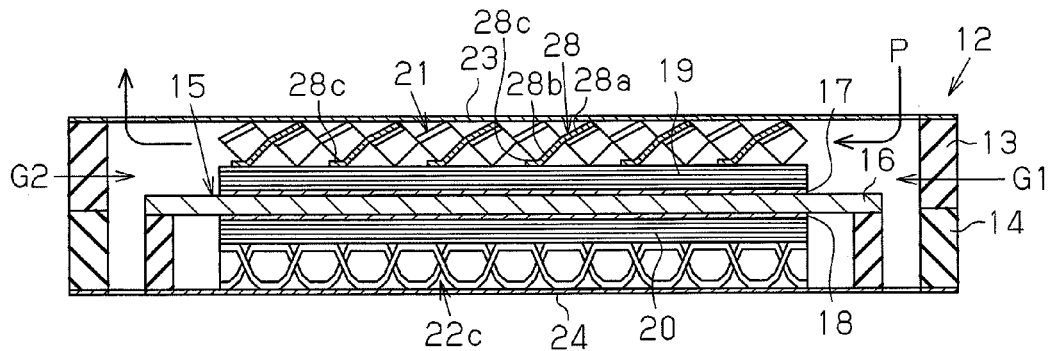
FIG. 14 is a cross-sectional view showing a power generation cell of the embodiment of FIG. 13.

In a fuel cell employing the gas passage forming members 21, 22 manufactured with the above-described device, as illustrated in FIG. 14, the flat surface portions 28c of the second inclined plate portions 28b are held in surface contact with the gas diffusion layers 19, 20 with respect to the surface of the gas diffusion layer 19 (20). Accordingly, compared to a case of linear contact, electric connection between the gas diffusion layers 19, 20 and the second inclined plate portions 28b is carried out adequately. This ensures smooth flow of electric power from the gas diffusion layers 19, 20 to the first and second gas passage forming members 21, 22, thus improving integration efficiency. Also, the contact portions of the gas diffusion layers 19, 20 that are held in contact with the second inclined plate portions 28b are prevented from being damaged.

Figure 15:
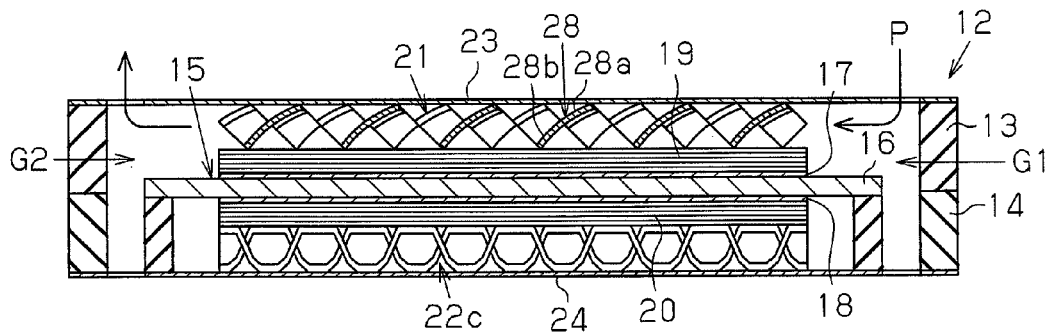
FIG. 15 is a cross-sectional view showing a power generation cell of another embodiment of the present invention.

As illustrated in FIG. 15, the first inclined plate portion 28a and the second inclined plate portion 28b of each linking plate portion 28 may be formed each in a smooth arcuate shape as a whole.

Figure 16:
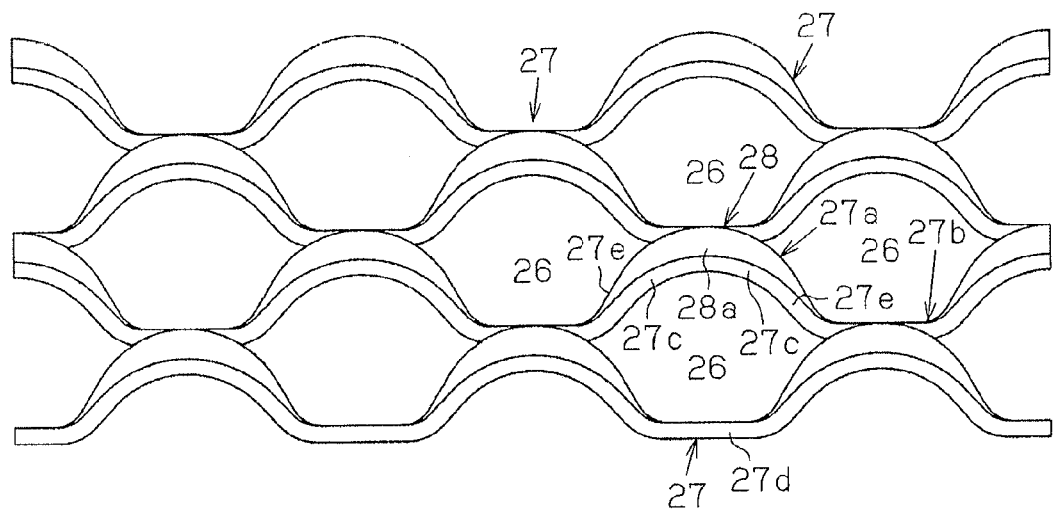
FIG. 16 is a partial front view showing a gas passage forming member of another embodiment of the present invention.
Figure 17:
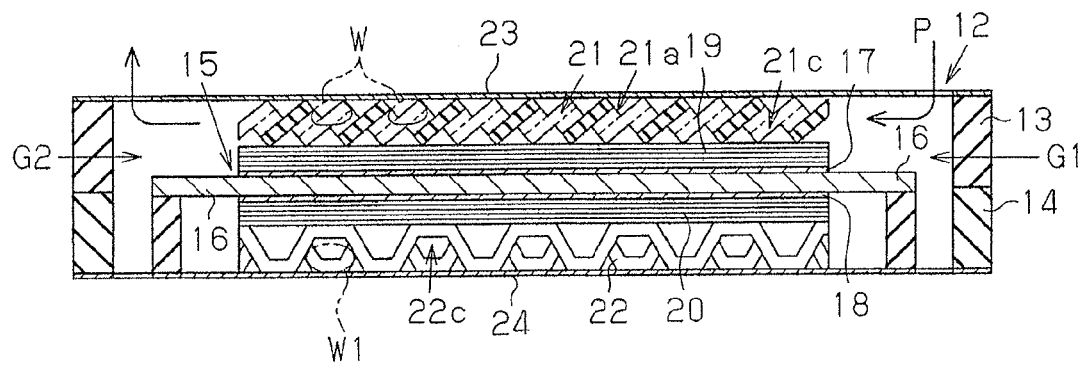
FIG. 17 is a longitudinal cross-sectional view showing a conventional power generation cell.
Figure 18:
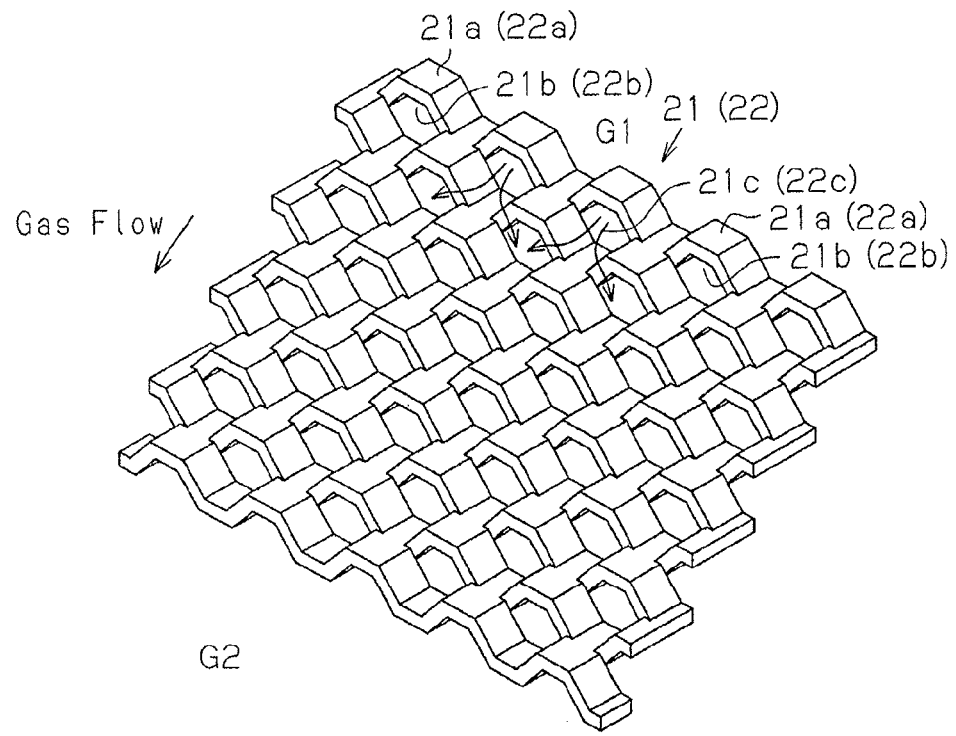
FIG. 18 is an enlarged partial perspective view showing a conventional gas passage forming member.
Figure 19:
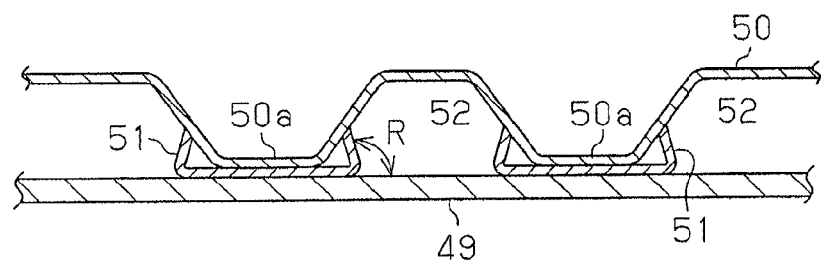
FIG. 19 is a partial cross-sectional view showing a conventional power generation cell.

With reference to FIG. 16, the shape of each ring portion 27 of the gas passage forming members 21, 22 may be changed to a substantially smooth arcuate shape. In this case, it is unnecessary to form angular portions in the forming surfaces of the projections 33a, the recesses 33b, the projections 34a, and the recesses 34b in the first and second cutting dies 33, 34 of the forming device. This increases durability of the first and second cutting dies 33, 34.

To form the flat surface portions 28c in the second inclined plate portions 28b, a method in which the metal lath 25 is compressed using a non-roller-type press by a predetermined amount in the direction of the thickness of the metal lath 25.

The present invention may be used in a fuel cell without the gas diffusion layers 19, 20.

As the material of the first and second gas passage forming members 21, 22, a conductive thin plate of metal such as stainless steel, aluminum, or copper may be employed other than the thin titanium plate.

Although not illustrated, the first cutting die 33 may be divided into a fixed die having the shearing edge 33c and a movable die including the projections 33a, the recesses 33b, the first forming surfaces 33d, the third forming surfaces 33e, the second forming surfaces 33f, and the fourth forming surfaces 33g. In this case, only the movable die is horizontally reciprocated.

While the invention has been described in detail and with reference to specific embodiments thereof, it will be apparent to one skilled in the art that various changes and modifications can be made therein without departing from the spirit and scope thereof.

The invention claimed is:

1. A gas passage forming member in a fuel cell, wherein the fuel cell comprises an electrode layer, a gas diffusion layer formed on a surface of the electrode layer, and a separator facing the gas diffusion layer, the fuel cell generating electric power through electrode reaction in the electrode layer, a gas passage being formed between the gas diffusion layer and the separator to supply fuel gas or oxidant gas to the electrode layer, wherein the gas passage forming member is configured by a metal lath formed by a thin metal plate, a plurality of ring portions each having a through hole having a prescribed form being formed in the gas passage forming member and arranged in a grid-like shape, the ring portions are connected together through linking plate portions, each of the linking plate portions being inclined with respect to a flow direction of the gas, each linking plate portion including a first inclined plate portion held in contact with a backside of the separator and a second inclined plate portion held in contact with a surface of the gas diffusion layer, and a first inclination angle, which is the angle between the first inclined plate portion and the separator, is set smaller than a second inclination angle, which is the angle between the second inclined plate portion and the gas diffusion layer.

2. The gas passage foaming member according to claim 1, wherein the first inclination angle and the second inclination angle are both set to an acute angle.

3. The gas passage forming member according to claim 1,
- wherein each of the ring portions of the gas passage forming member has a first semi-ring portion and a second semi-ring portion, the first semi-ring portion being held in contact with the backside of the separator and including the first inclined plate portion, and the second semi-ring portion being held in contact with the surface of the gas diffusion layer and including the second inclined plate portion,
- a pair of third inclined plate portions are formed in the first semi-ring portion at the left and right sides of the first inclined plate portion as viewed in the flow direction of the gas, and a pair of fourth inclined plate portions are formed in the second semi-ring portion at the left and right sides of the second inclined plate portion as viewed in the flow direction of the gas, and
- a third inclination angle, which is the angle between the separator and each of the third inclined plate portions, is set smaller than a fourth inclination angle, which is the angle between the gas diffusion layer and each of the fourth inclined plate portions.

4. The gas passage forming member according to claim 3, wherein the third inclination angle and the fourth inclination angle are both set to an acute angle.

5. The gas passage forming member according to claim 1, wherein the second inclined plate portion has a flat surface portion that is held in surface contact with the surface of the gas diffusion layer.

* * * * *